(12) United States Patent
Crow et al.

(10) Patent No.: US 11,637,949 B2
(45) Date of Patent: *Apr. 25, 2023

(54) HEATSINKS FOR AN IMAGE CAPTURE DEVICE

(71) Applicant: GoPro, Inc., San Mateo, CA (US)

(72) Inventors: Kielan C. Crow, San Mateo, CA (US); Nicholas Vitale, Foster City, CA (US); Eduardo Hernandez Pacheco, Sunnyvale, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,302

(22) Filed: Sep. 30, 2021

(65) Prior Publication Data

US 2022/0021795 A1 Jan. 20, 2022

Related U.S. Application Data

(63) Continuation of application No. 16/846,033, filed on Apr. 10, 2020, now Pat. No. 11,146,711.

(51) Int. Cl.
*H04N 5/225* (2006.01)
(52) U.S. Cl.
CPC ....... *H04N 5/22521* (2018.08); *H04N 5/2252* (2013.01)
(58) Field of Classification Search
CPC .................. H04N 5/2252; H04N 5/22521
See application file for complete search history.

(56) References Cited

U.S. PATENT DOCUMENTS

| 5,471,027 | A | 11/1995 | Call |
| 6,097,598 | A | 8/2000 | Miyahara |
| 7,329,869 | B2 | 2/2008 | Cassel |
| 9,025,080 | B2 | 5/2015 | Samuels |

(Continued)

FOREIGN PATENT DOCUMENTS

| CN | 110235059 | 9/2019 |
| CN | 110235059 A | 9/2019 |

(Continued)

OTHER PUBLICATIONS

International Search Report and Written Opinion for App. No. PCT/US2021/026140, dated Jul. 1, 2021, 10 pages.

(Continued)

*Primary Examiner* — Amy R Hsu
(74) *Attorney, Agent, or Firm* — Young Basile Hanlon & MacFarlane, P.C.

(57) ABSTRACT

An image capture device includes a heatsink that absorbs thermal energy and a first component that generates thermal energy. The image capture device includes a second component that generates thermal energy and a first conductor that extends between the first component and the heatsink, and the first conductor moves thermal energy from the first component to the heatsink by conduction. The image capture device includes a second conductor that extends between the second component and the heatsink, and the second conductor has a portion perpendicularly extended relative to the first conductor. The second conductor moves thermal energy from the second component to the heatsink by conduction.

20 Claims, 12 Drawing Sheets

(56) References Cited

U.S. PATENT DOCUMENTS

| | | |
|---|---|---|
| 9,860,970 B2 | 1/2018 | Tolbert |
| 9,910,342 B2 | 3/2018 | Samuels |
| 10,613,420 B2 | 4/2020 | Ali |
| 10,656,689 B2 | 5/2020 | Kilgore |
| 10,701,249 B1 | 6/2020 | Guo |
| 11,146,711 B1 | 10/2021 | Crow |
| 11,277,545 B2 | 3/2022 | Crow |
| 2003/0202328 A1 | 10/2003 | Deeney |
| 2004/0169771 A1* | 9/2004 | Washington ....... H04N 5/22521 348/E5.025 |
| 2006/0100336 A1 | 5/2006 | Fukui |
| 2008/0205881 A1 | 8/2008 | Sakurai |
| 2010/0296805 A1* | 11/2010 | Mayer ............... G08B 13/19619 396/155 |
| 2011/0127912 A1 | 6/2011 | Lee |
| 2011/0194009 A1* | 8/2011 | Park ..................... H04N 5/2252 348/E5.022 |
| 2012/0035418 A1* | 2/2012 | Talbert ............... H04N 5/22521 600/109 |
| 2014/0055671 A1 | 2/2014 | Kawamura |
| 2014/0104479 A1 | 4/2014 | Samuels |
| 2014/0160284 A1* | 6/2014 | Achenbach ............... B60R 1/12 29/854 |
| 2015/0049243 A1* | 2/2015 | Samuels ............. H04N 5/2253 348/374 |
| 2016/0174408 A1* | 6/2016 | Tolbert ................... H05K 1/181 348/373 |
| 2016/0334692 A1 | 11/2016 | Samuels |
| 2016/0349601 A1 | 12/2016 | Kungl |
| 2017/0070652 A1* | 3/2017 | Müller ................... B60R 11/04 |
| 2017/0195531 A1* | 7/2017 | Warren ................... B23P 15/26 |
| 2017/0195533 A1* | 7/2017 | Seo ........................ G03B 37/04 |
| 2017/0294694 A1* | 10/2017 | Tso ......................... H04N 5/33 |
| 2018/0107099 A1 | 4/2018 | Yasuda |
| 2018/0259831 A1 | 9/2018 | Chiu |
| 2019/0041600 A1* | 2/2019 | Sakamoto ............. G03B 15/00 |
| 2019/0056643 A1 | 2/2019 | Chang |
| 2019/0163037 A1 | 5/2019 | Koyama |
| 2019/0346126 A1 | 11/2019 | Wada |
| 2020/0033774 A1 | 1/2020 | Shinji |
| 2020/0064533 A1 | 2/2020 | Miyazaki |
| 2020/0344395 A1 | 10/2020 | Guo |
| 2021/0033815 A1 | 2/2021 | Lin |
| 2021/0122299 A1 | 4/2021 | Garcia |
| 2021/0274067 A1 | 9/2021 | Crow |
| 2021/0306536 A1 | 9/2021 | Vitale |
| 2021/0321027 A1 | 10/2021 | Crow |
| 2021/0344819 A1 | 11/2021 | Vitale |
| 2022/0159148 A1 | 5/2022 | Crow |

FOREIGN PATENT DOCUMENTS

| | | |
|---|---|---|
| JP | 2004020798 | 1/2004 |
| JP | 2004020798 A | 1/2004 |
| JP | 2006086752 A | 3/2006 |
| JP | 2008015476 A | 1/2008 |
| JP | 5322866 B2 | 10/2013 |
| JP | 2017073634 | 4/2017 |
| JP | 2017073634 A | 4/2017 |

OTHER PUBLICATIONS

U.S. Appl. No. 16/803,139, filed Feb. 27, 2020, Crow et al., entitled Heatsink of an Image Capture Device.

International Search Report and Written Opinion for App. No. PCT/US2021/019970, dated Jun. 3, 2021, 9 pages.

* cited by examiner

HEATSINKS FOR AN IMAGE CAPTURE DEVICE

CROSS-REFERENCE TO RELATED APPLICATIONS

This application is a continuation of U.S. application Ser. No. 16/846,033, filed on Apr. 10, 2020, the entire disclosure of which is incorporated by reference.

TECHNICAL FIELD

This disclosure relates generally to image capture devices, and more specifically, to a system of heatsinks used in image capture devices.

BACKGROUND

Photography during physical activity has been improved by use of simple-to-operate, lightweight, compact cameras (or other image capture devices). Advancements in technology have allowed for more functionality and faster components to be added to the cameras, allowing for clearer images and video to be captured. Additionally, cameras have become sealed so that the cameras may be splashed, submerged, or otherwise inundated with water without impacting performance. Camera components can be tightly packed together within a sealed housing for a smaller, more user-friendly camera. Consequently, the tightly-packed components retain heat that can interfere with performance of the various components and cause an increase in thermal loads within the camera, which can negatively impact camera performance. Thus, a heat system that mitigates thermal loads within a camera that is sealed would be useful.

SUMMARY

Disclosed herein are implementations of a heatsink for an image capture device.

One aspect includes an image capture device including a first component configured to provide thermal energy. A heatsink is spaced a distance apart from the first component, and a second component is positioned between the first component and the heatsink. A conductor contacts the first component and the heatsink, and the conductor extends from the first component along sides of the second component to the heatsink.

Another aspect includes an image capture device including a heatsink, a printed circuit board configured to provide thermal energy, and first and second components separating the printed circuit board and the heatsink. A conductor facilitates management of thermal energy and connects the printed circuit board and the heatsink by extending along sides of the first component and between the first component and the second component.

Another aspect includes an image capture device including a first heatsink, a second heatsink, and a printed circuit board configured to provide thermal energy and positioned between the first heatsink and the second heatsink. A component separates the first heatsink and the printed circuit board, and a conductor facilitates movement of thermal energy and extends along sides of the component to connect the printed circuit board, the first heatsink, and the second heatsink.

Another aspect includes an image capture device including a heatsink that absorbs thermal energy and a first component that generates thermal energy. The image capture device includes a second component that generates thermal energy and a first conductor that extends between the first component and the heatsink, and the first conductor moves thermal energy from the first component to the heatsink by conduction. The image capture device includes a second conductor that extends between the second component and the heatsink, and the second conductor has a portion perpendicularly extended relative to the first conductor. The second conductor moves thermal energy from the second component to the heatsink by conduction.

Another aspect includes an image capture device including a heatsink that has a cutout that is generally centered, a first side, and a second side, and the heatsink absorbs thermal energy and blocks electromagnetic signals. The first side has first and second portions located adjacent to the cutout. The image capture device includes a sensor positioned adjacent to the first portion of the first side of the heatsink that generates thermal energy and a liquid-crystal display in contact with or adjacent to the second side of the heatsink. The liquid-crystal display generates electromagnetic signals. The image capture device includes a circuit extending from the second side, through the cutout, to the second portion of the first side so the circuit is free of contact with the first portion of the first side, and the circuit amplifies electromagnetic signals.

Another aspect includes an image capture device that has a printed circuit board having parallel first and second surfaces that are separated by a top edge. The image capture device includes a component disposed on the first surface of the printed circuit board that generates thermal energy and a heatsink positioned adjacent to the second surface of the printed circuit board that absorbs thermal energy. The image capture device includes a conductor that extends from the component, across the first surface, over the top edge, and to the heatsink.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

As more components and processing power are added to image capture devices, more heat is added to the image capture devices. Improved thermal management of the image capture device becomes important to provide for extended use of the image capture device. Management of heat with and along a heatsink may allow for extended use of an image capture device before the heat retained within the image capture device impacts operation or before components become potentially damaged. The heatsink may balance heat from components by connecting the heatsink and heat producing component with a conductor that circumvents intervening components so that heat is transferred over a long distance within the camera or from a first region of the camera to a second region of the camera. The conductor can connect two components with the heat producing component such that heat is balanced between a front heatsink and a rear heatsink. Further, the heatsink may act as a barrier between components that provide electromagnetic signals so that the heatsink blocks electromagnetic signals and performance of the components is not reduced or adversely effected.

Figure 1A:
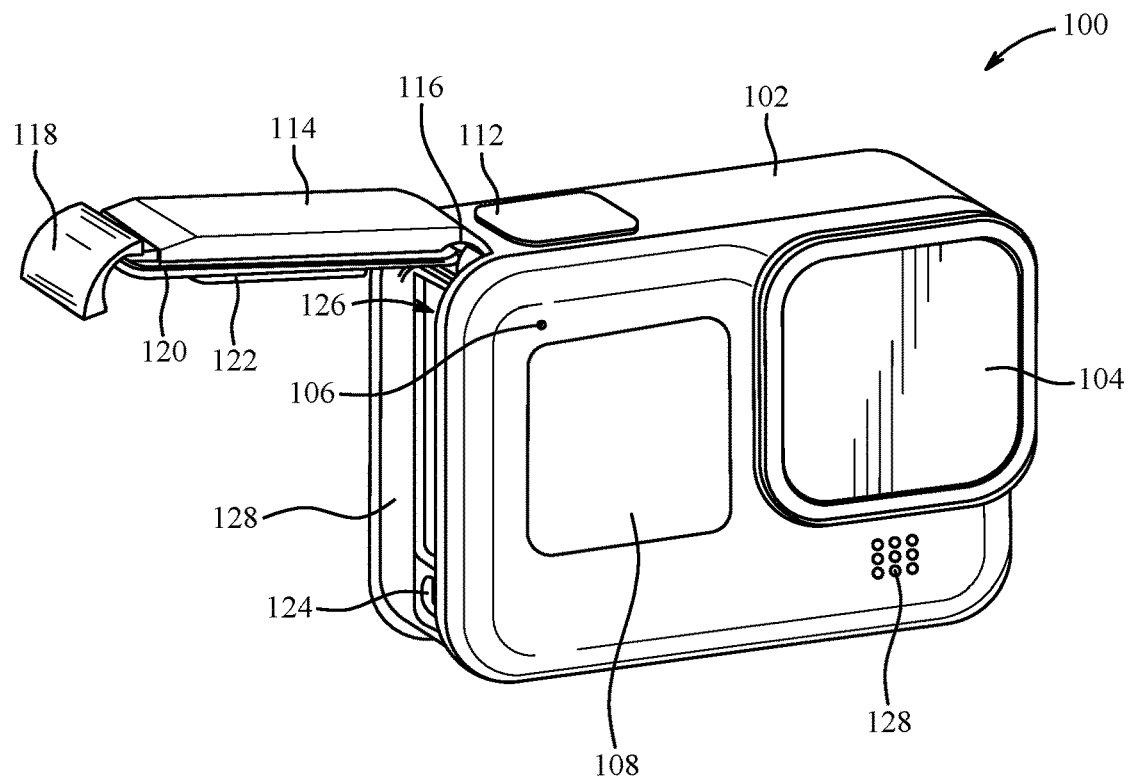
FIGS. 1A-B are isometric views of an example of an image capture device.
Figure 1B:
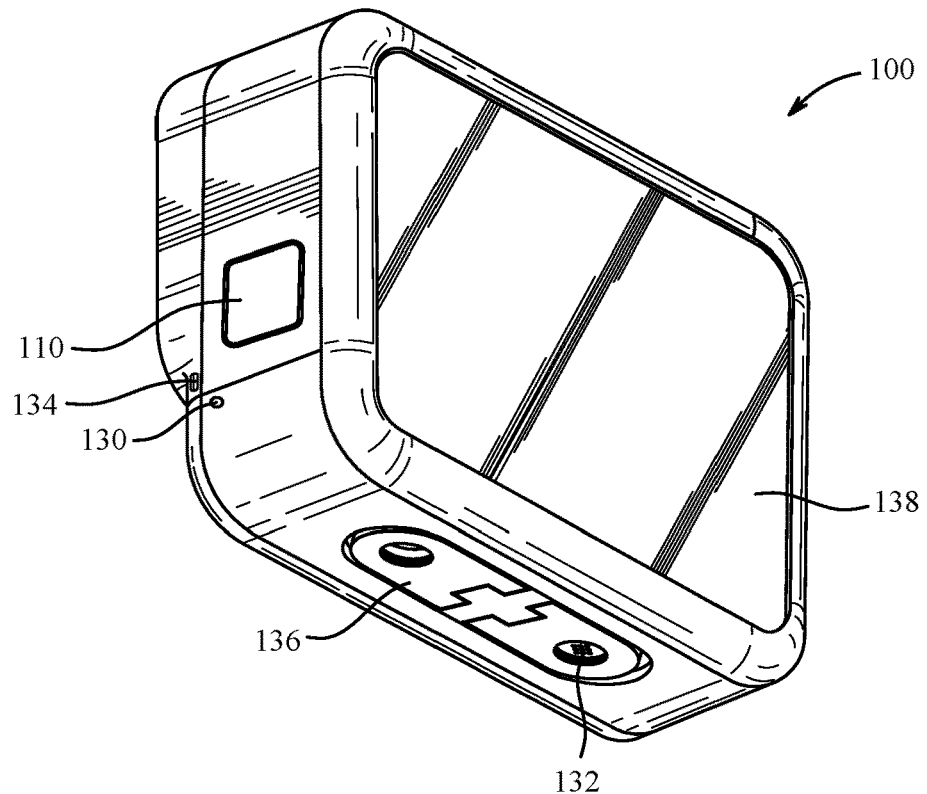

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
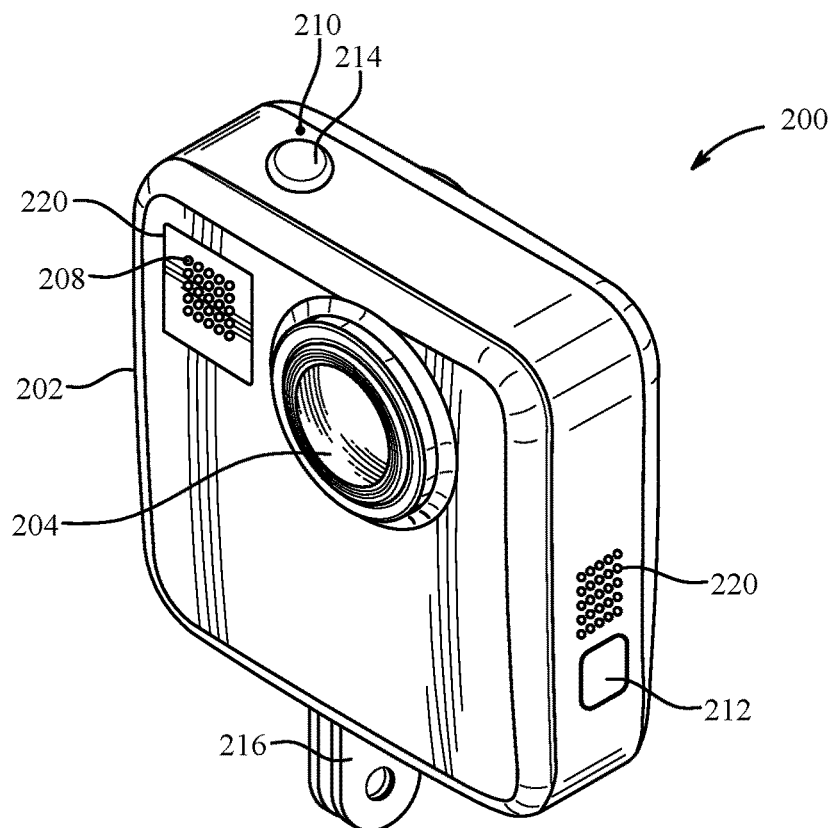
FIGS. 2A-B are isometric views of another example of an image capture device.
Figure 2B:
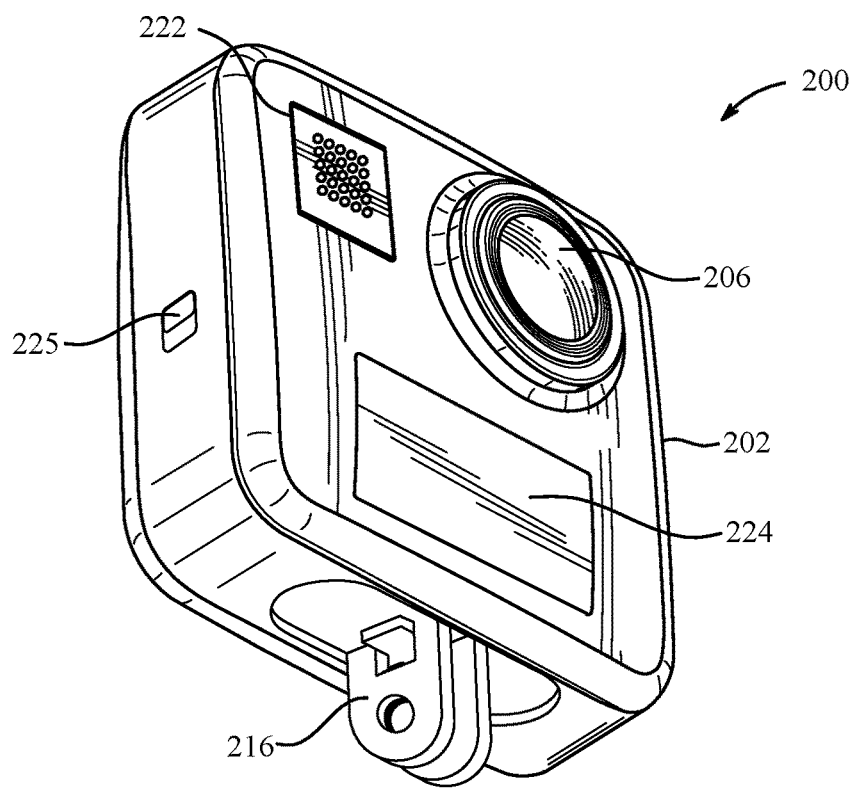

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
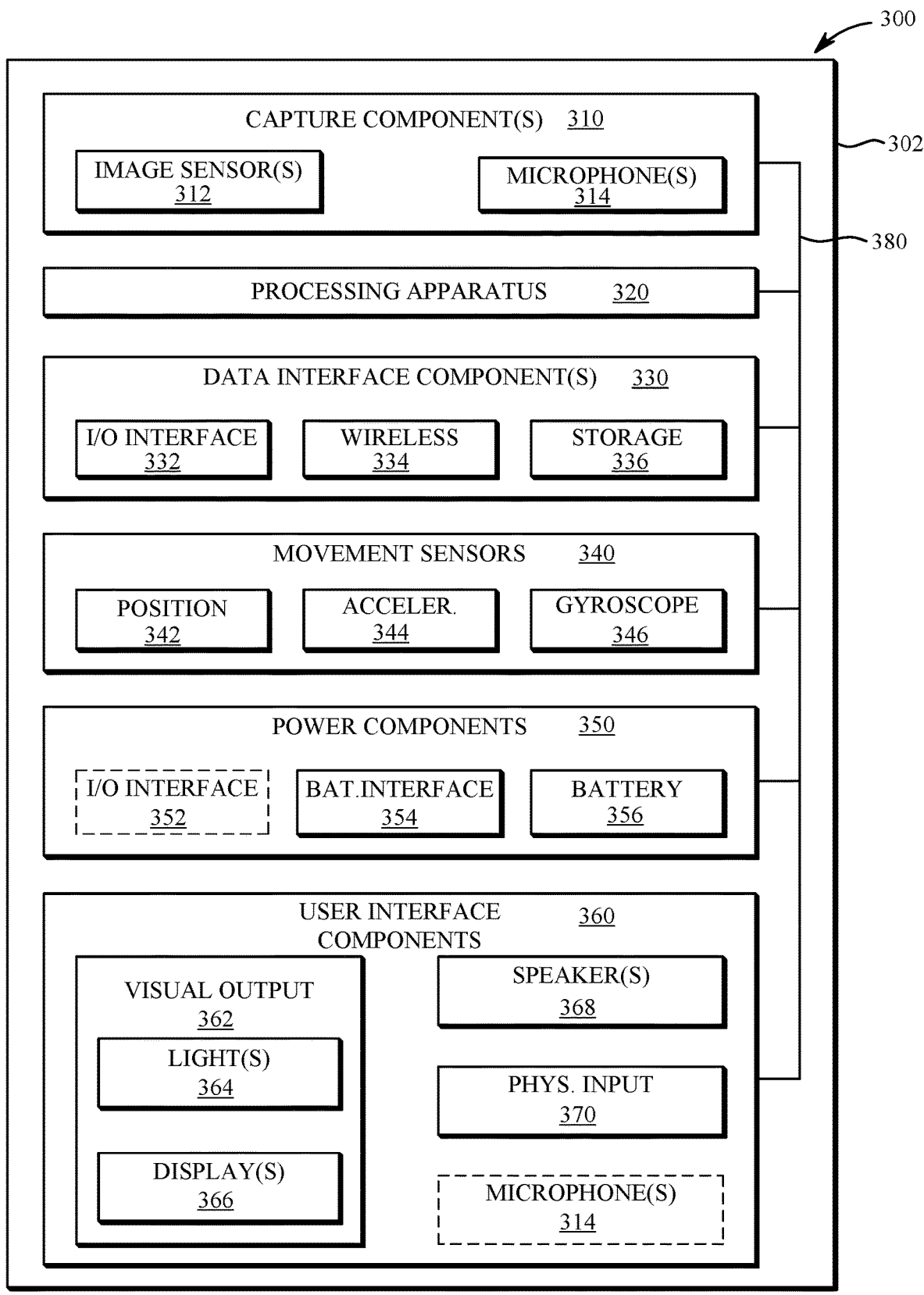
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include the I/O interface 332, as indicated in dotted line, and the power components 350 may receive power from an external source, such as a wall plug or external battery, for operating the image capture device 300 and/or charging the battery 354 of the image capture device 300.

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or one or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4:
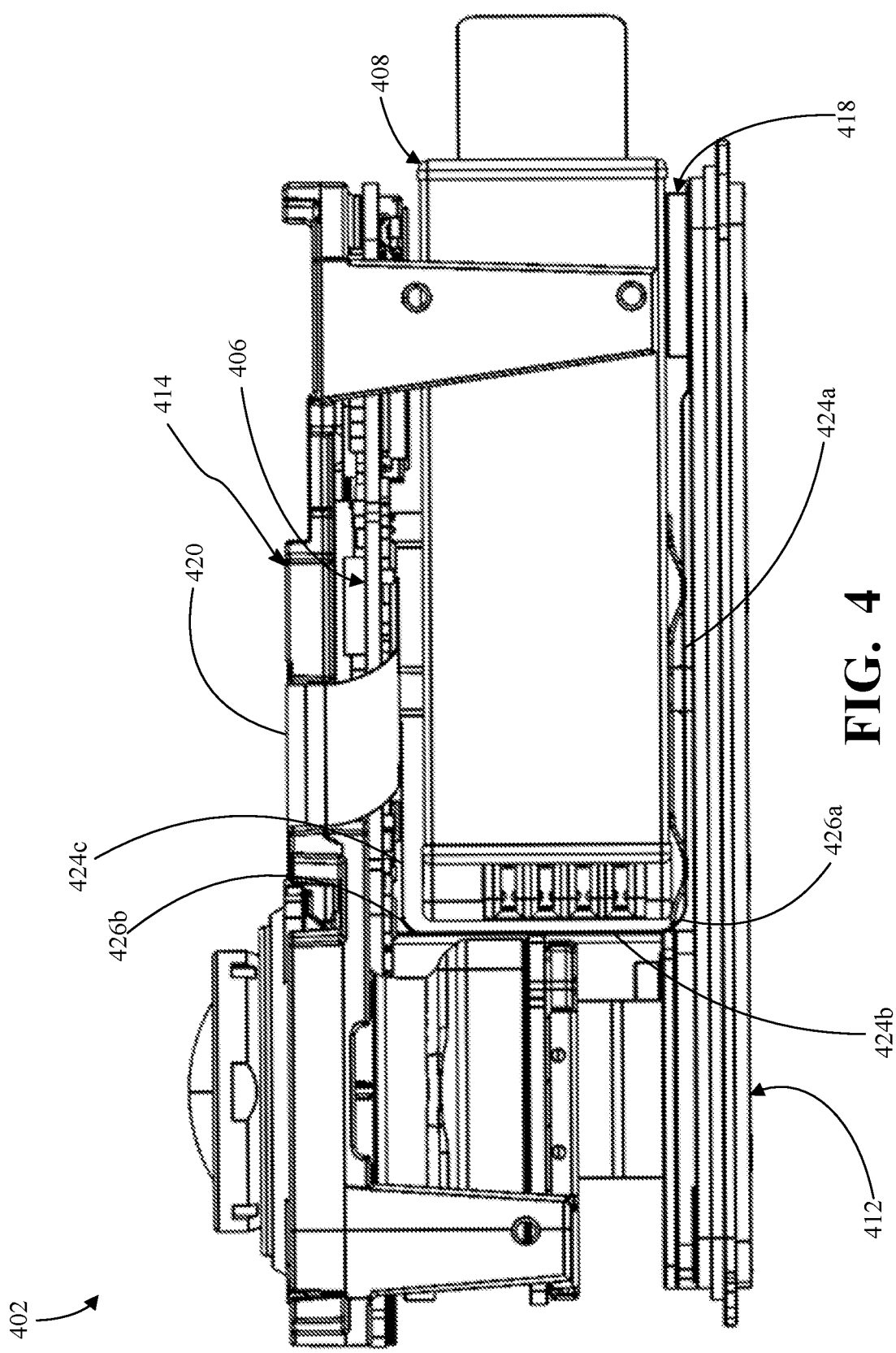
FIG. 4 is a top view of a heat system used inside of an image capture device.

FIG. 4 is a top view of a heat system 402 used inside of an image capture device, such as the image capture devices 100, 200 of FIGS. 1A-2B. The heat system 402 may be enclosed by a body of an image capture device, such as the body 102 of FIG. 1A, so that the heat system 402 and the body are a closed system. The heat system 402 includes a printed circuit board (PCB) 406 and a component 408 that are centrally located relative to a first heatsink 412 and a second heatsink 414 so that the heatsinks 412, 414 surround the PCB 406 and the component 408. To distribute evenly or otherwise balance thermal energy throughout the heat system 402, the first heatsink 412 and the second heatsink 414 are located on opposing sides of or otherwise separated by the PCB 406 and the component 408 so that each provide thermal energy. The second heatsink 414 and the PCB 406 may be linked by one or more locator pins (not shown) to stabilize the PCB 406 and/or facilitate movement or management of thermal energy between the second heatsink 414 and the PCB 406 by conduction.

Between the heatsinks 412, 414, the PCB 406 and/or the component 408 is configured to provide or generate thermal energy. When providing thermal energy for the heat system 402, the PCB 406 and/or the component 408 may include one or more additional components (not shown) that are configured to provide or generate thermal energy. For example, the component(s) associated with the PCB 406 or the component 408 may include a processor, a module, a battery, an input-output interface, a battery cage, an image processor, a RAM device, a card controller, an analog/digital converter, a card slot, a GPS system, a combination thereof, or any other component that provides thermal energy during operation of the component(s). If the component 408 is a battery or other connectable component, the component 408 may be readily disconnected from the heat system 402 without interfering with the conductors 418, 420 or the heatsinks 412, 414, for example, using a door such as the door 114 of FIG. 1A. Any component, the PCB 406, the component 408, or other circuit, as described herein, may be described as a first component, a second component, a third component, or a fourth component for clarity.

In the heat system 402, the heatsinks 412, 414 function as a passive heat exchanger that may receive thermal energy for transferring or dissipating via conduction or convection. The heatsinks 412, 414 may be entirely located within a housing or a body or portions thereof may extend outside of the housing or the body. The heatsinks 412, 414 may individually or in combination have a threshold predetermined mass capacity that is an amount of thermal energy that can be received to balance the thermal energy distributed in the heat system 402. The heatsinks 412, 414 may be configured to dissipate thermal energy emitting from any component that provides thermal energy, including the PCB 406 and/or the component 408, so that the first heatsink 412, the second heatsink 414, or both attain the predetermined thermal energy capacity at substantially a same time.

Because of the structural versatility of the heat system 402, the first heatsink 412, the second heatsink 414, or both may be positioned in a front, a back, a side, a top, or a bottom of an image capture device, such as the image capture devices 100, 200 of FIGS. 1A-2B. The first heatsink 412 and the second heatsink 414 may be located on opposite sides or opposite regions of the image capture device. For example, the first heatsink 412 may extend along a front side, and the second heatsink 414 may extend along a rear side of the image capture device.

For controlling conduction in the heat system 402, the heatsinks 412, 414 connect by the conductors 418, 420 that facilitate the movement or management of thermal energy from the PCB 406, the component 408, or any other component(s). For facilitating thermal energy, the first heatsink 412, the second heatsink 414, or both may be made of or include aluminum, aluminum alloys, copper, or copper alloys. When connecting, the conductors 418, 420 may be a single contiguous conductor that connects multiple components together or may be physically separate pieces such that the conductors 418, 420 are spaced a distance a part. The conductors 418, 420 may be composed of a material suitable to manage or move thermal energy such as graphite, graphene, metals, aluminum, silver, copper, polyimide, silicone-coated fabrics, gap fillers, epoxy, thermal grease, or any combination thereof.

For circumventing the PCB 406, the component 408, or both, the conductor 418 provides a connection that is thermal, mechanical, or both between the first heatsink 412 and the PCB 406 to assist with conduction or convection in the heat system 402. For connecting the first heatsink 412 and the PCB 406, straight portions 424a, 424b, 424c extend along sides of the PCB 406, the component 408, and the first heatsink 412 and curve at bent portions 426a, 426b so that thermal energy can be moved from the PCB 406 to the first heatsink 412. Alternatively, any of the straight portions 424a, 424b, 424c may extend adjacent to, in contact with, around with a space between, or proximate to the first heatsink 412, the PCB 406, or both.

Figure 5A:
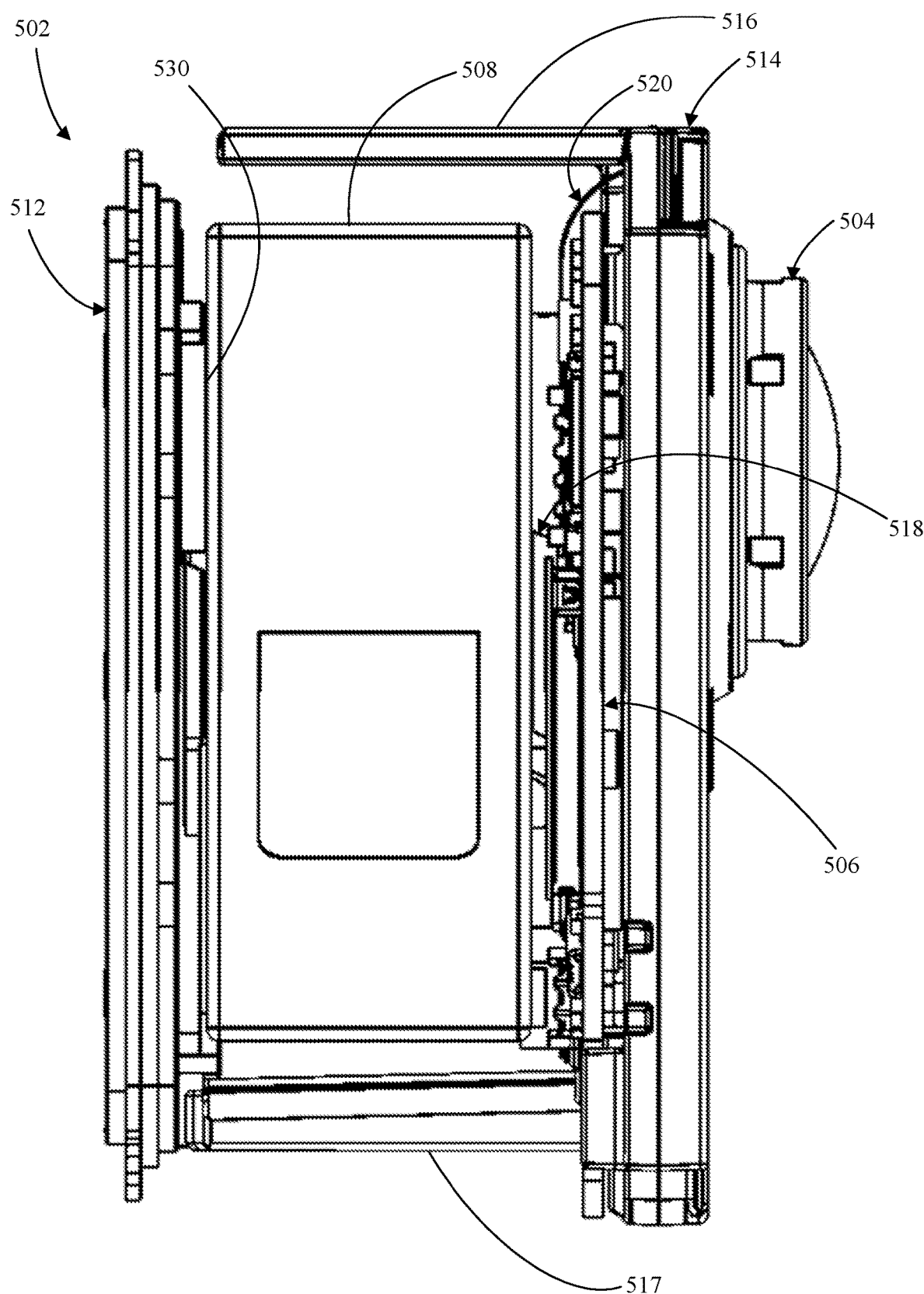
FIG. 5A is a side view of a heat system of FIG. 4.

FIG. 5A is a side view of a heat system 502 similar to the heat system 402 of FIG. 4. The heat system 502 encloses or partially encloses a lens 504, a PCB 506, a component 508, and another component 510 configured to provide thermal energy. The heat system 502 includes a first heatsink 512 and a second heatsink 514 that may be similar to the heatsinks 412, 414 in the heat system 402 of FIG. 4. The details of the components are discussed below.

For supporting the component 508 in the heat system 502, the second heatsink 514 includes flanges 516 positioned above a top side and flanges 517 positioned below a bottom side of the component 508 so that the component 508 is housed in a basket or slot structure. The flanges 516, 517 may connect to a structure that houses the component 508 so that thermal energy provided by the component 508 is moved by conduction through the structure to the heatsink 514. For separating the heatsinks 512, 514, the component 508 is positioned between the heatsinks 512, 514 so that thermal energy may be dissipated over a larger volumetric space relative to a single heatsink, such as only the second heatsink 514. The larger volumetric space may allow thermal energy to be dissipated by convection or conduction or, alternatively, may allow for more thermal energy to be distributed between the first heatsink 512 and the second heatsink 514 so that activity time of an image capture device including the heatsinks 512, 514 may be extended compared with a system where the thermal energy is not balanced. The flanges 516, 517 may provide more volumetric space to distribute thermal energy in the heat system 502 by increasing the overall mass of the second heatsink 514.

Around the component 508 and the PCB 506, the heatsinks 512, 514 are connected by multiple conductors 518, 520 that circumvent the backside of the component 508 and the PCB 506 so that the component 508 is able to be disconnected at a side portion or location of the heat system 502 while thermal energy distribution is at the same time increased. The conductors 518, 520 may extend along any side of the component 508 or the PCB 506, such as a back, a bottom, a top, a front, or any other side, to circumvent the component 508 and connect to either of the heatsinks 512, 514. The conductors 518, 520 may be similar to the conductors 418, 420 of FIG. 4. The heatsinks 512, 514 distribute thermal energy in the heat system 502 so that an amount of thermal energy located on opposing sides of the system may be balanced to extend activity time. Activity time may mean that the image capture device is capturing images as described by any technique described herein and, for example, may be between about 20 minutes and about 80 minutes, about 30 minutes and about 70 minutes, or about 40 minutes and about 60 minutes.

Figure 5B:
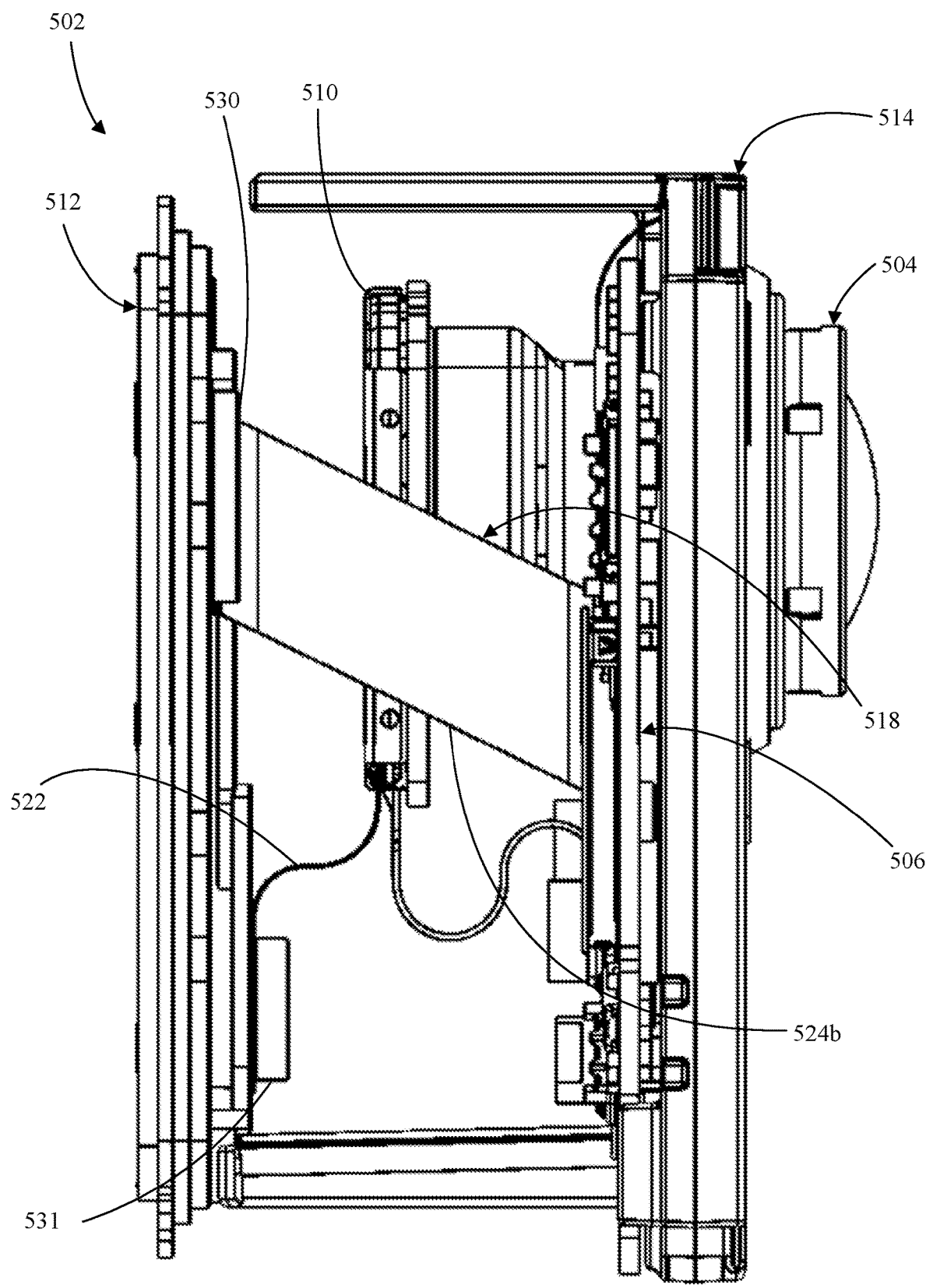
FIG. 5B is an opposite side view of the heat system of FIG. 5A.

FIG. 5B is an opposite side view of the heat system 502 of FIG. 5A, with the component 508 removed for clarity. The lens 504 connects with the component 510 that is configured to provide thermal energy to the heat system 502. For example, the component 510 may heat up during operation such that introducing thermal energy into the heat system 502 and the first heatsink 512, the second heatsink 514, or both may move or manage the thermal energy introduced into the heat system 502. The component 510 may be similar to the component 408 or any component associated with the PCB 406 of FIG. 4. Another conductor 522 connects the component 510 and the first heatsink 512 to help facilitate movement or management of thermal energy from the component 510. The conductor 522 is serpentine shaped so that the conductor 522 is capable of circumventing other components in an image capture device, such as the image capture devices 100, 200 of FIG. 1A-2B.

As shown in FIG. 5B, the first heatsink 512 and the PCB 506 are connected by a straight portion 524b that extends in a diagonal manner or shape so that the conductor 518 contacts the densest portion of volumetric area on the first heatsink 512, the PCB 506, or both. Alternatively, while connected to the first heatsink 512 and the PCB 506, another straight portion (not shown in FIG. 5B) of the conductor 518 may extend along or contact sides of the component 510 so that thermal energy from the component 510 may be dissipated through convection, conduction, or both based on having a location adjacent to or in contact with the component 510. The contact position of the conductor 518 to the PCB 506, component 510, or both may have the densest volumetric area where thermal energy is provided in higher abundance relative to other portions on the PCB 506 or component 510 that provide thermal energy. Furthermore, the conductor 518 may contact the first heatsink 512 at a location having a densest volumetric area or on a portion of the first heatsink 512 that is furthest from other components that provide thermal energy.

The conductor 518 and the first heatsink 512 contact at a conductor box 530. The conductor box 530 is laterally offset with the point of contact of the PCB 506 and the conductor 518 relative to the first heatsink 512 so that the point of contact with the first heatsink 512 is above the point of contact with PCB 506. The conductor 522 contacts the first heatsink 512 at another conductor box 531 that may be similar to the conductor box 530. The conductor boxes 530, 531 press the conductors 518, 522 against the first heatsink 512 to create a mechanical connection, thermal connection, or both between the conductors 518, 522 and the first heatsink 512. The conductor boxes 530, 531 may be composed of foam or similar compressible material so that other components may assist in pressing the conductor boxes 530, 531 against the conductors 518, 522 and the heatsink 512.

Figure 6A:
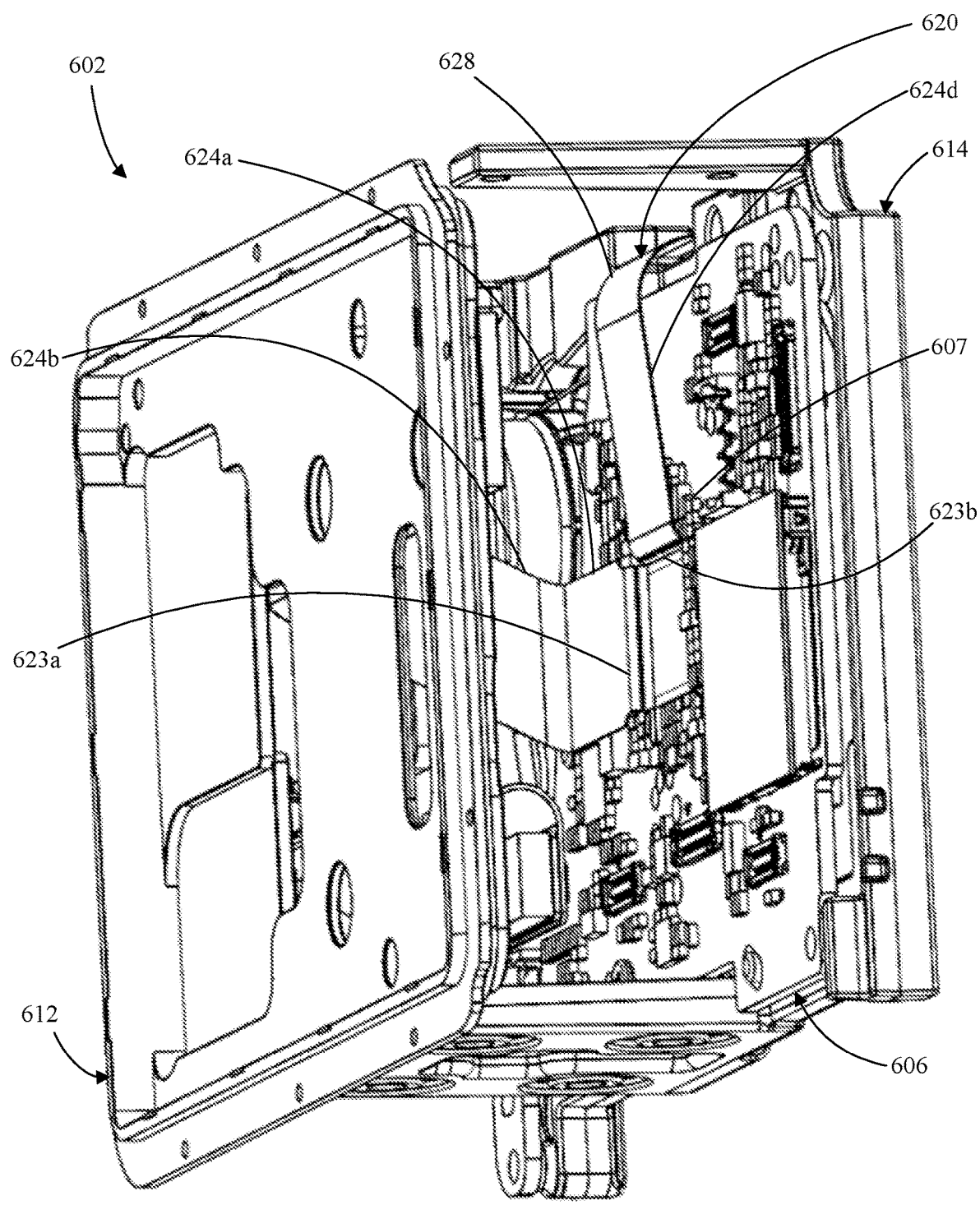
FIG. 6A is a perspective view of the heat system of FIGS. 5A-5B.
Figure 6B:
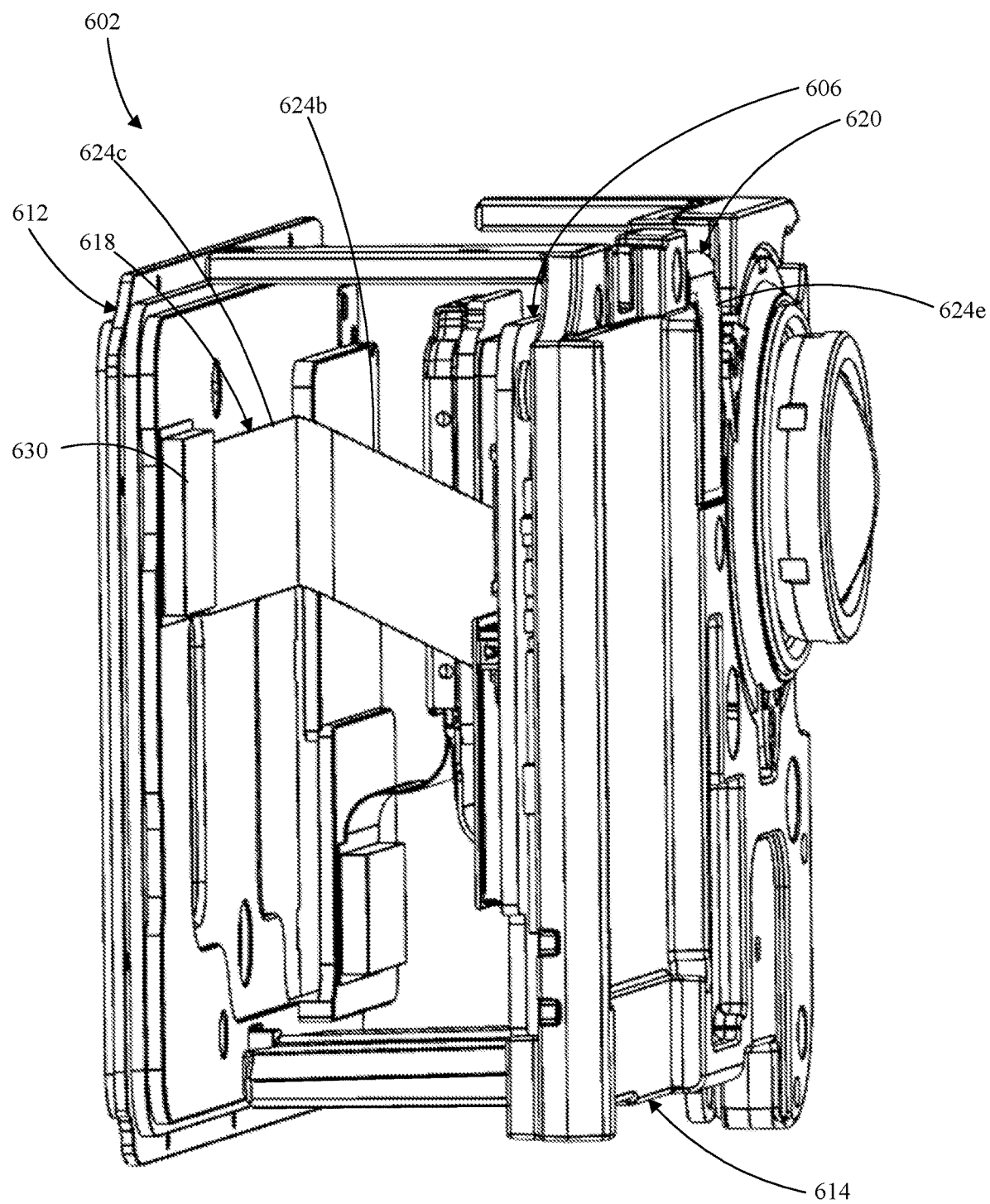
FIG. 6B is another perspective view of the heat system of FIGS. 5A-5B.

FIG. 6A is a perspective view of a heat system 602 similar to the heat system 502 of FIG. 5A-5B. FIG. 6B is a different perspective view of the heat system 602 of FIG. 6A. The heat system 602 includes a PCB 606, a component 607 configured to provide thermal energy, a first heatsink 612, and a second heatsink 614. The component 607 is disposed on the PCB 606, and the PCB 606 may be similar to the PCB 406 in FIG. 4 or the PCB 506 in FIGS. 5A-5B. The component 607 may be present and not shown in other iterations of a heat system, such as the heat systems 402, 502 illustrated in FIGS. 4-5B. In some examples, the PCB 606, the component 607, or both may provide thermal energy throughout the heat system 602.

In a similar manner to the heatsinks 412, 414, 512, 514 and the conductors 418, 420, 518, 520 of FIGS. 4-5B, the heatsinks 612, 614 move thermal energy provided by the component 607 through conductors 618, 620 to dissipate thermal energy by conduction or convection through the heat system 602. A portion or multiple portions of the component 607 may be covered by a portion of the conductor 618, the conductor 620, or both, so that the component 607 may be coupled to the first heatsink 612, the second heatsink 614, or both. The conductors 618, 620 may be directly connected to the component 607, the heatsinks 612, 614, or any combination thereof through a thermal paste that conducts thermal energy that passes through the conductors 618, 620, the heatsinks 612, 614, the component 607, or any combination thereof. For stronger connections to the conductors 618, 620, the thermal paste may be a thermal adhesive, tape, or grease that provides a mechanical connection or structural bond between the conductors 618, 620 and the heatsinks 612, 614. Examples of thermal paste include an epoxy blend, a cyanoacrylate blend, and/or a composition containing metals, graphite, or graphene so that thermal conduction or facilitation is improved.

To free the conductors 618, 620 from contact with the PCB 606, the conductors 618, 620 include raised portions 623a, 623b that directly contact each other and the component 607 and raise the conductors 618, 620 from a surface(s) of the PCB 606. In some examples, the raised portions 623a, 623b are free of contact with each other. The raised portion 623a associated with the conductor 618 contacts the straight portions 624a, 624b, 624c that connect the conductor 618 and the PCB 606, and the raised portion 623b of the conductor 620 connects with the straight portions 624d, 624e that connect the conductor 620 and the second heatsink 614. Having a clip-like shape and structure, the conductor 620 contacts the component 607 on a side of the PCB 606, and the conductor 620 contacts a side of the second heatsink 614 that faces away from the PCB 606 so that that the conductor 620 moves over an edge of the PCB 606 and an edge of the second heatsink 614 at a curved portion 628 of the conductor 620. Like the conductor boxes 530, 531 of FIGS. 5A-B, a conductor box 630 provides a direct connection for the straight portion 624c of the conductor 618 and the first heatsink 612. Thus, a contiguous connection among the heatsinks 612, 614 and the component 607 is made so that the conductors 618, 620 are free of direct contact with the PCB 606.

Figure 7A:
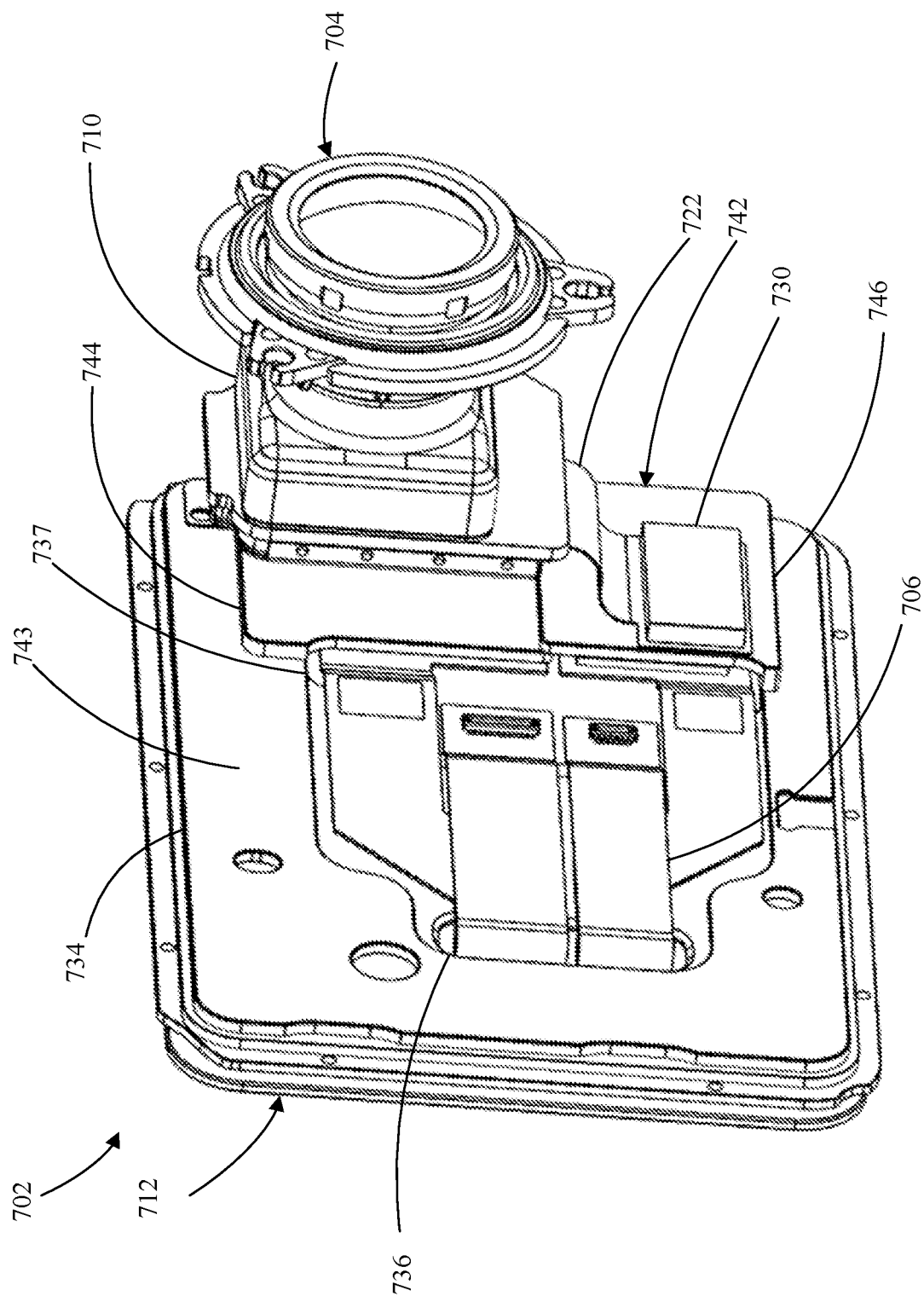
FIG. 7A is a perspective view of a heatsink used inside of an image capture device.

FIG. 7A is a perspective view of a heat system 702 used in an image capture device, such as the image capture devices 100, 200 of FIGS. 1A-2B. The heat system 702 includes a lens 704, a circuit 706, a component 710, a heatsink 712, a conductor 722, and a conductor box 730. The circuit 706 may be similar to the PCB 406 of FIG. 4 or the PCB 606 of FIGS. 6A-6B. The component 710 may be similar to the component 408 of FIG. 4 or the component 510 of FIG. 5A-5B. The heatsink 712 may be similar to the first heatsink 412 of FIG. 4. The conductor 722 may be similar to the conductors 418, 420 of FIG. 4 or the conductor 522 of FIGS. 5A-5B. The conductor box 730 may be similar to the conductor boxes 530, 531 of FIGS. 5A-5B. Details of the heat system 702 are discussed herein.

Structurally, the heatsink 712 includes a base 734, cutouts 736, 737, and a recess 742 so that a portion of the circuit 706 is stored in a position within the recess 742 that is separated from the component 710. The heatsink includes a front surface 743 and an opposing rear surface (not shown) so that the circuit 706 contacts the front surface 743 at the base 734, routes through the cutout 737, and contacts the rear surface at the recess 742. One cutout 736 is defined in the base 734 and contacts a portion of the circuit 706, and the other cutout 737 contacts the recess 742, the base 734, and another portion of the circuit 706.

For additional housing configurations of the circuit 706 or other components, the recess 742 has a staggered structure that includes a shallow portion 744 and a deep portion 746. The shallow portion 744 and the deep portion 746 are spaced a distance away from the component 710 so that the recess 742 is free of contact with the component 710. However, the deep portion 746 contacts the conductor box 730, which, along with the conductor 722, facilitates the movement or management of thermal energy between the heatsink 712 and the component 710.

For mitigating electromagnetic signals that are provided or emitted by the component 710, the heatsink 712 divides or separates the component 710 and a portion of the circuit 706 so that part of the heatsink 712 is positioned between the portion of the circuit 706 and the component 710. Further, the blocking or mitigating of electromagnetic signals by the heatsink 712 from the component 710 prevents the circuit 706 from acting as an antenna for amplifying electromagnetic signals and, thus, interfering with other components or functionalities in the image camera device, such as WiFi reception or GPS signaling. The component 710 is proximate to, contacting, adjacent to, or spaced apart from the front surface 743 at the recess 742 so that the heatsink 712 separates the portion of the circuit 706 that is proximate to the rear surface at the recess 742 and the component 710 that is proximate to the front surface 743 at the recess 742. In some examples, the recess 742, the base 734, or portions of both may be positioned directly or indirectly between the component 710 and the portion of the circuit 706 or any other component.

Additionally, the heatsink 712 may include an LCD screen (not shown), a display, or a similar component that is adjacent to the circuit 706, the rear surface of the heatsink 712, or both. For mitigating amplification of electromagnetic signals from the component 710, the heatsink 712 separates or divides the LCD screen and the circuit 706 from the component 710 by being a physical wall. However, in some examples, the heatsink 712 may divide or separate the component 710, the LCD screen, the circuit 706, or a combination thereof so that alternative combinations are possible. In addition, the heatsink 712 may be a physical wall between the component 710 and the circuit 706, and the heatsink 712 may blocks or mitigates electromagnetic signals from interfering with or damaging other components that are adjacent to or in contact with the heatsink 712 or the LCD screen. Further, in examples where the circuit 706 provides thermal energy, the base 734 and the recess 742 efficiently house the circuit 706 and can be configured to distribute or dissipate thermal energy from the component 710, the circuit 706, or both. Finally, the base 734 and the recess 742 provide a staggered structure that permits housing combinations of components, like the circuit 706 and the LCD screen, and allows for blocking or mitigation of unintended inter-component interactions near the heatsink 712. In other words, the heatsink 712 is serving as a structural separation between components in order to provide interference from electromagnetic signals that come into contact with the circuit 706.

Figure 7B:
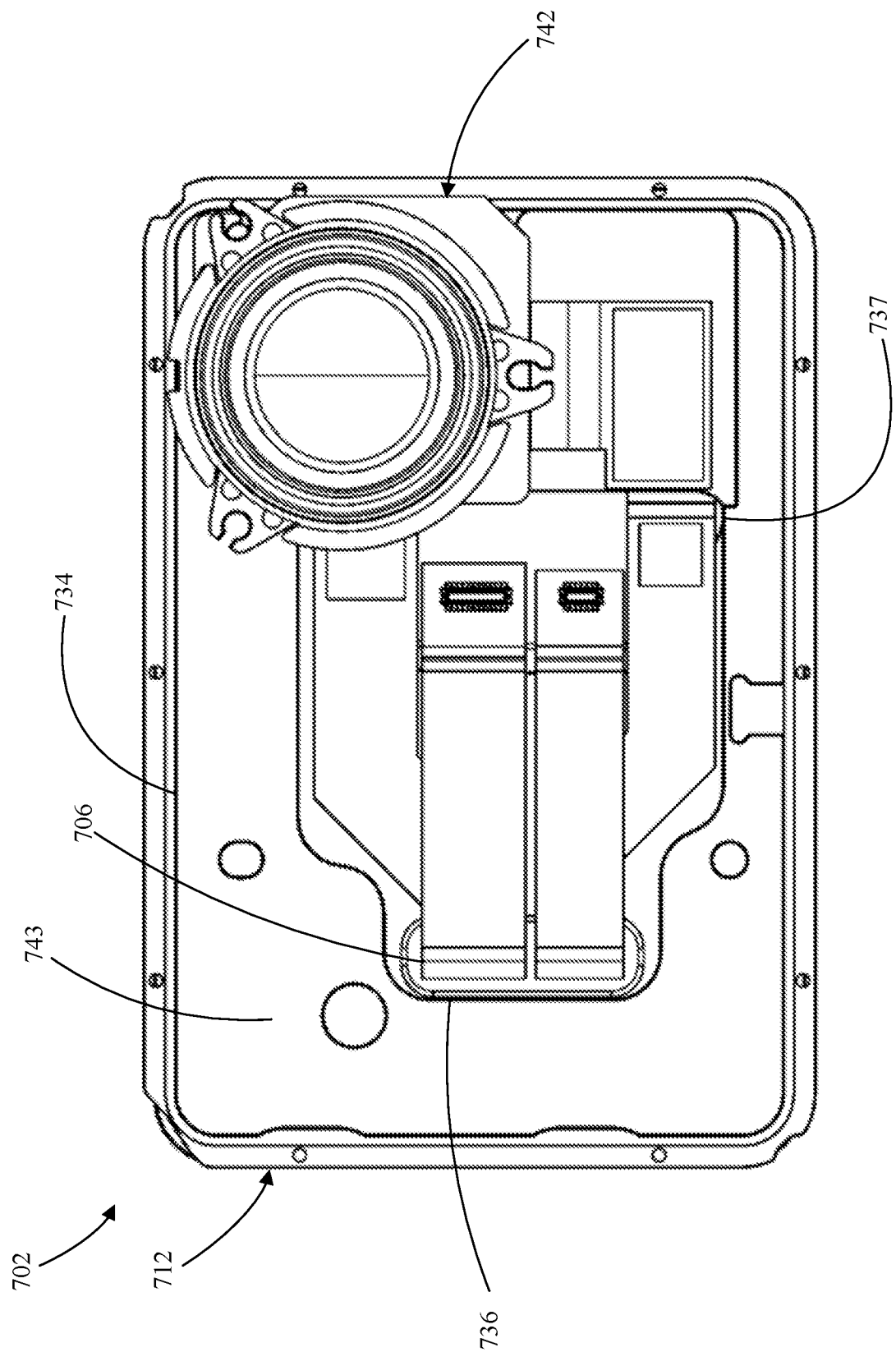
FIG. 7B is a front view of the heatsink of FIG. 7A.

FIG. 7B is a front view of the heatsink 712 of FIG. 7A. For connecting components that are adjacent to the opposing rear surface (not shown) and the front surface 743 of the heatsink 712, the circuit 706 contacts the rear surface at the recess 742, extends through the cutout 737, and contacts the front surface 743 at the base 734. As the circuit 706 continues to extend along the front surface 743, the circuit 706 contacts the cutout 736 and folds back approximately 180 degrees towards the recess 742 so that a portion of the circuit 706 is folded over and contacting another portion of the circuit 706. An edge of the cutout 736 is free of contact with an edge of the circuit 706 so that a gap is defined between the cutout 736 and the circuit 706 and additional circuitry (not shown) can be routed from or through the rear surface, the gap, and the front surface 743 to connect with other components in the image capture device.

Figure 8A:
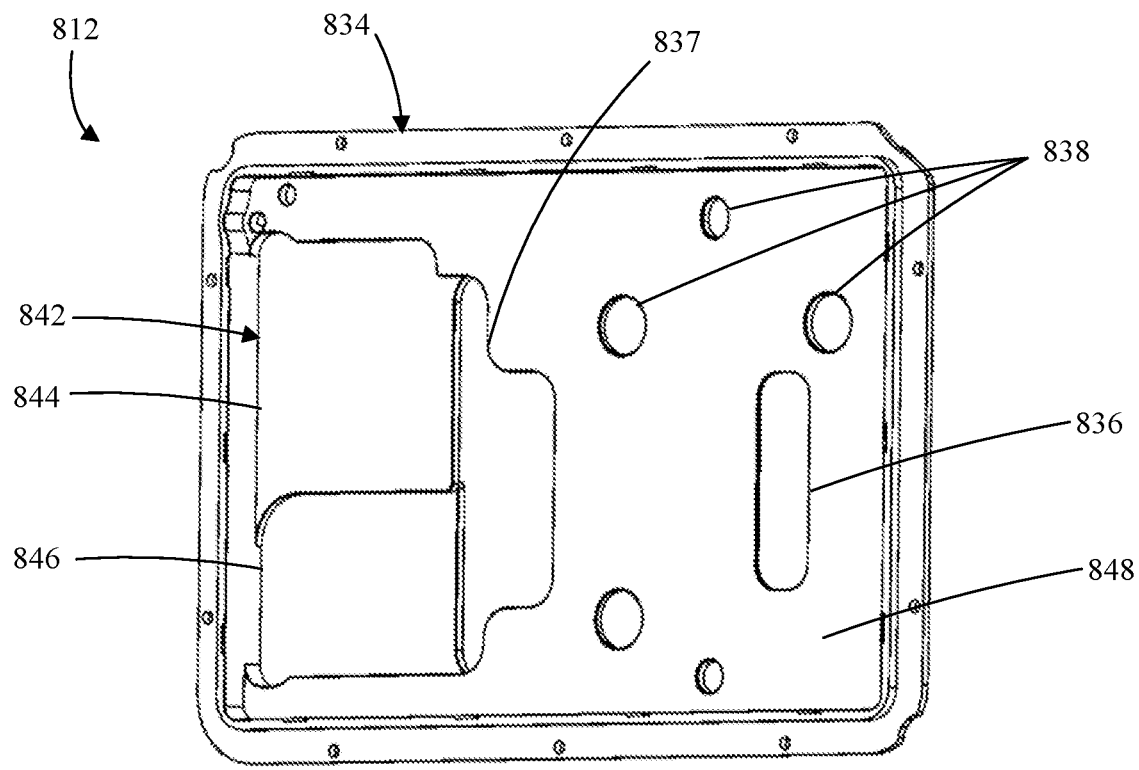
FIG. 8A is a front perspective view of the heatsink of FIGS. 7A-B.
Figure 8B:
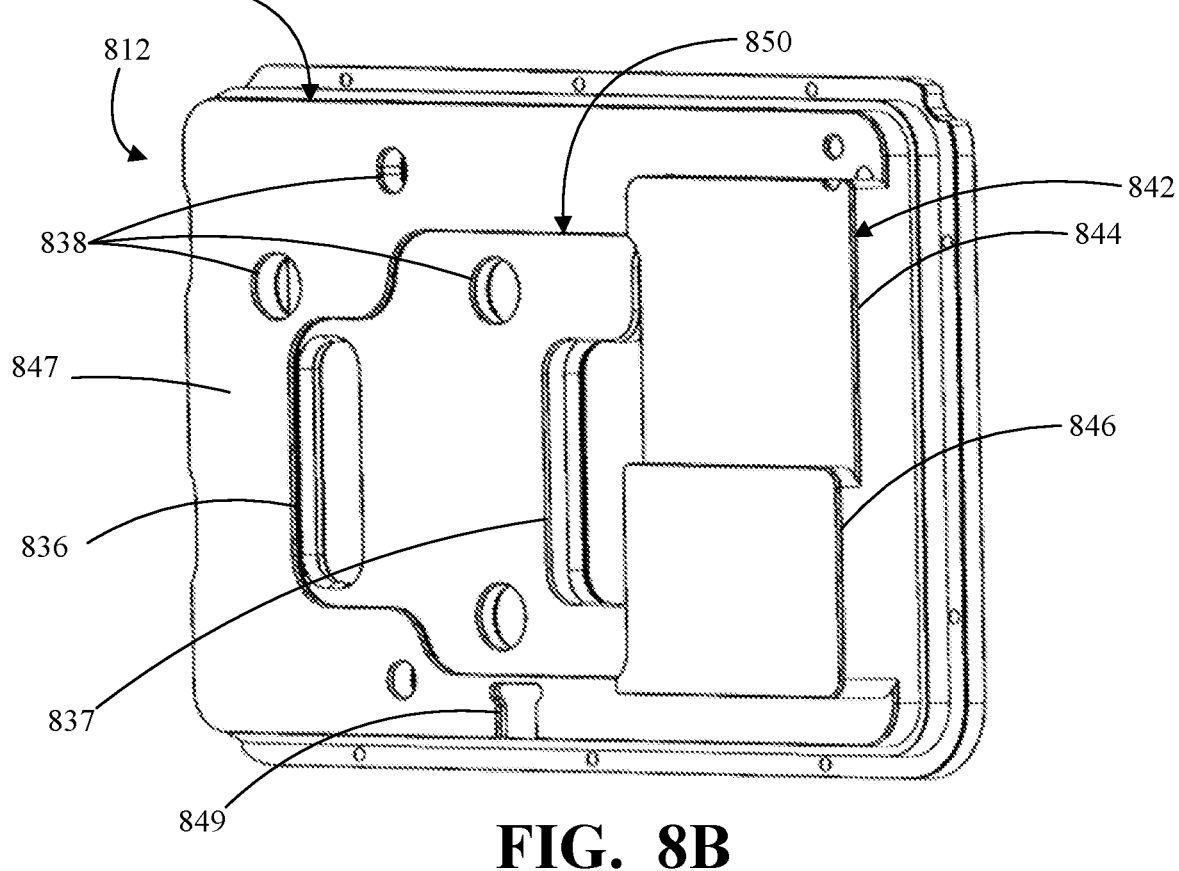
FIG. 8B is a rear perspective view of the heatsink of FIG. 8A.
Figure 8C:
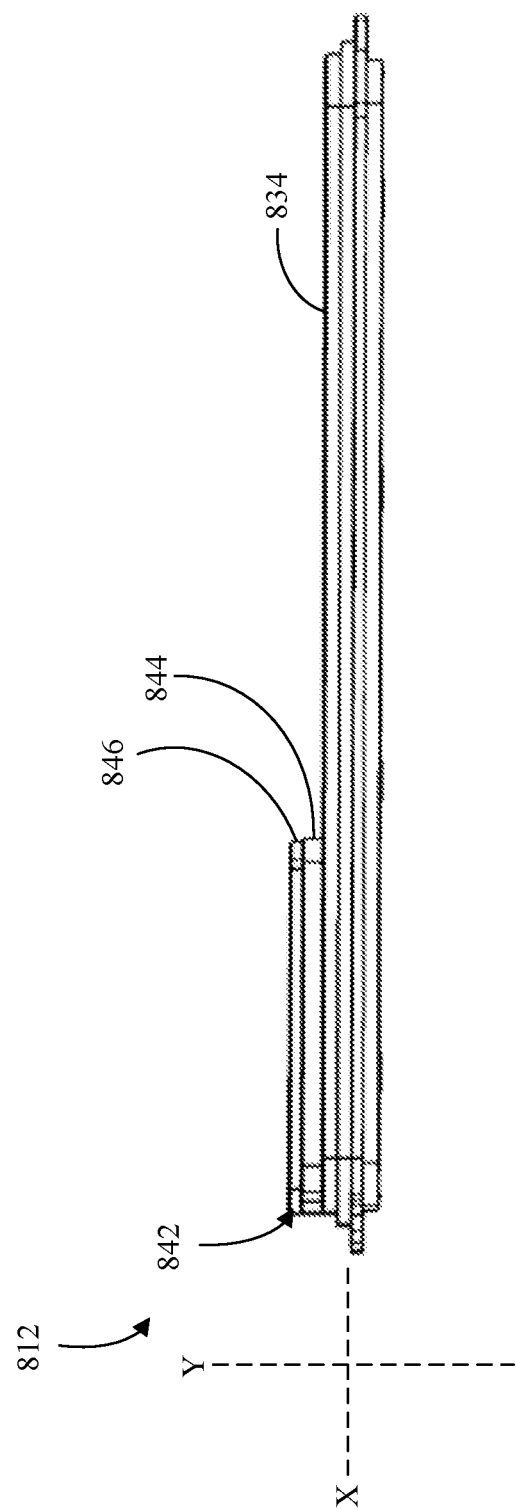
FIG. 8C is a side view of the heatsink 812 of FIGS. 8A-8B.

FIGS. 8A-8C illustrate the specific structural intricacies and advantages of another example of a heatsink 812. FIG. 8A is a front perspective view of the heatsink 812. The heatsink 812 may be similar to the heatsink 712 of FIGS. 7A-7B. The heatsink 812 may also be similar to the first heatsink 412 of FIG. 4 or the heatsink 712 of FIG. 7A-7B. The heatsink 812 includes a base 834, cutouts 836, 837, apertures 838, and a recess 842. The base 834 is in a first generally horizontal plane, and the recess 842 is in a second generally horizontal plane so that the first plane and the second plane are laterally offset by a perpendicular distance. The recess 842 has a staggered structure that includes a shallow portion 844 and a deep portion 846 laterally offset from each other so that additional configurations of components may be housed within the recess 842. Generally horizontal surfaces of the shallow portion 844 and the deep portion 846 are spaced from the surface of the base 834 in a perpendicular direction, and the deep portion 846 is spaced further from a surface of the base 834 than the shallow portion 844. The staggered structure of the shallow portion 844 and the deep portion 846 of the recess 842 provides multiple surfaces for connecting conductors, such as conductor 522 of FIG. 5, that help to move thermal energy of the components for improved thermal energy balance or distribution within a heat system.

For providing a pass-through in the heatsink 812 to any component, the cutout 836 is defined in the base 834, and the other cutout 837 is in defined in both the base 834 and the recess 842 so that one edge of the cutout 837 contacts the base 834 and another edge of the cutout 837 contacts the recess 842. The cutouts 836, 837 provide a pathway for a circuit, such as the circuit 706 of FIGS. 7A-7B, to contact the heatsink 812 on a front surface 847 and an opposing rear surface 848 so that a portion of the circuit contacts the front surface 847 and another portion contacts the rear surface 848. In some examples, components, like an LCD screen or the component 710 of FIGS. 7A-7B, may contact either the front surface 847 or the rear surface 848.

FIG. 8B is a rear perspective view of the heatsink 812 of FIG. 8A. The base 834 includes a cutout 849 that may house any connection or component used in an image capture device or heat system, such as the image capture devices 100, 200 of FIGS. 1A-2B or the heat systems 402, 502 of FIGS. 4-5B. The base 834 includes a depression 850 that is laterally offset from a surface of the base 834 in a perpendicular direction away from a surface of the recess 842 to allow for housing additional component(s). For routing electrical connections within a heat system, the depression 850 allows for a circuit (not shown, e.g., the circuit 706 of FIGS. 7A-7B) to be inserted within the depression 850 and routed through the cutout 836, the cutout 837, or both. The circuit can then be connected one or more components, such as an LCD, in an image capture device.

FIG. 8C is a side view of the heatsink 812 of FIGS. 8A-8B. An X-axis and a Y-axis of the heatsink 812 are indicated to show the staggered structure of the recess 842 and the base 834. The recess 842 is raised in a direction along the Y-axis above the base 834, and the shallow portion 844 and the deep portion 846 are staggered along the Y-axis above the base 834. A surface of the base 834 runs an entire width of the heatsink 812 along the X-axis and covers multiple sides of the recess 842 to form a cup-like structure that is capable of housing any component described herewith. The additional space provided by the recess 842 allows any component to be stored at the rear surface 848 of the heatsink 812 so that the heatsink 812 can physically separate or divide varying components in an image capture device. Additionally, the composition of the heatsink 812 or the physical obstruction from the presence of the heatsink 812 may provide interference with electromagnetic signals or excessive thermal energy distribution so that interference among varying components is avoided or mitigated and, thus, activity time is extended, as discussed herewith.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
   a heatsink configured to absorb thermal energy;
   a first component configured to generate thermal energy;
   a second component configured to generate thermal energy;
   a first conductor that extends between the first component and the heatsink, the first conductor configured to move thermal energy from the first component to the heatsink by conduction; and
   a second conductor that extends between the second component and the heatsink, the second conductor having a portion perpendicularly extended relative to the first conductor, the second conductor configured to move thermal energy from the second component to the heatsink by conduction.

2. The image capture device of claim 1, wherein the second conductor absorbs the thermal energy from the first component by convection.

3. The image capture device of claim 2, wherein a third component separates the heatsink and the second component so that the second conductor extends from the second component, along a corner of the third component, and to the heatsink.

4. The image capture device of claim 3, wherein the second conductor extends over at least two walls of the third component.

5. The image capture device of claim 3, wherein the second conductor extends over at least two corners of the third component.

6. The image capture device of claim 3, wherein the second conductor separates the first and third component to mitigate transfer of thermal energy between the first and/or third component by convection.

7. The image capture device of claim 6, wherein the first component is a sensor configured to capture images through a lens, and wherein the third component is a battery configured to generate thermal energy.

8. The image capture device of claim 1, wherein the second component is a processor that is disposed on a printed circuit board of the image capture device.

9. The image capture device of claim 1, wherein the first and second conductors are free of contact, and wherein the first and second conductors contact the heatsink at different locations so that thermal energy is absorbed by the heatsink at different locations.

10. An image capture device, comprising:
a heatsink comprising a cutout that is generally centered, a first side, and a second side, the heatsink configured to absorb thermal energy and block electromagnetic signals, the first side having first and second portions located adjacent to the cutout;
a sensor positioned adjacent to the first portion of the first side of the heatsink and configured to generate thermal energy;
a liquid-crystal display in contact with or adjacent to the second side of the heatsink, the liquid-crystal display configured to generate electromagnetic signals; and
a circuit extending from the second side, through the cutout, to the second portion of the first side so the circuit is free of contact with the first portion of the first side, the circuit configured to amplify electromagnetic signals.

11. The image capture device of claim 10, wherein the first portion includes a recess that extends perpendicularly towards the sensor, the recess configured to house a portion of the circuit.

12. The image capture device of claim 11, wherein the recess has a staggered structure including a shallow portion and a deep portion laterally offset from each other.

13. The image capture device of claim 11, wherein, at the second portion, another portion of the circuit folds approximately 180 degrees toward the recess so that the portion of the circuit is contacting another portion of the circuit.

14. The image capture device of claim 11, wherein the circuit is configured to generate thermal energy, wherein the circuit contacts the heatsink, and wherein the heatsink is configured to absorb thermal energy from the heatsink by conduction.

15. The image capture device of claim 10, further comprising:
a conductor extending between the sensor and the heatsink, the conductor configured to move thermal energy from the sensor to the heatsink.

16. An image capture device, comprising:
a printed circuit board having parallel first and second surfaces that are separated by a top edge;
a component disposed on the first surface of the printed circuit board and configured to generate thermal energy;
a heatsink positioned adjacent to the second surface of the printed circuit board and configured to absorb thermal energy, wherein the heatsink has opposing first and second surfaces separated by a top edge, and wherein the first surface of the heatsink is adjacent to the second surface of the printed circuit board; and
a conductor that extends from the component, across the first surface, over the top edge, and to the heatsink, wherein the conductor extends from the component, across the first surface of the printed circuit board, over the top edges of the printed circuit board and the heatsink, to the second surface of the heatsink so that energy is absorbed by the heatsink at the second surface.

17. The image capture device of claim 16, wherein the conductor is free of contact with the printed circuit board.

18. The image capture device of claim 16, wherein the component is a processor.

19. The image capture device of claim 16, further comprising:
another conductor that extends from the component to another heatsink.

20. The image capture device of claim 16, wherein the conductor comprises graphite, graphene, metals, aluminum, silver, copper, polyimide, silicone-coated fabrics, or any combination thereof.

* * * * *